Dec. 23, 1969   D. H. HEMMING ET AL   3,485,208
APPARATUS FOR INJECTING TOBACCO SMOKE MODIFYING MATERIAL
INTO MULTIPLE LENGTH FILTER RODS
Filed Dec. 28, 1964   5 Sheets-Sheet 5

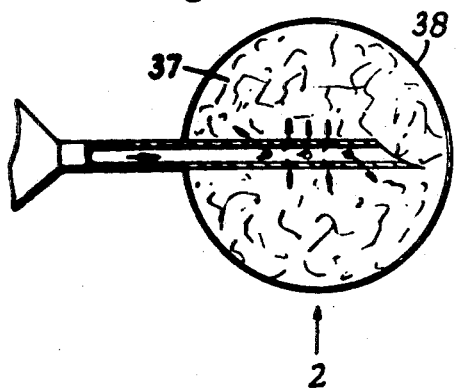
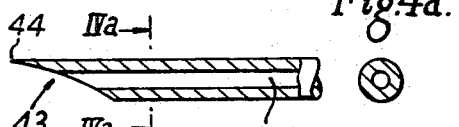
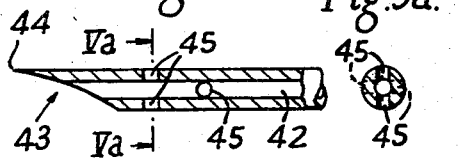
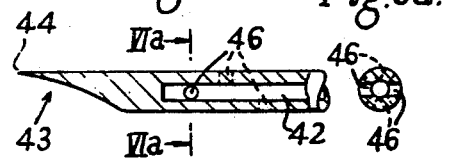
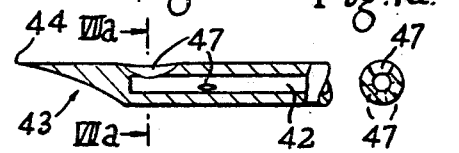
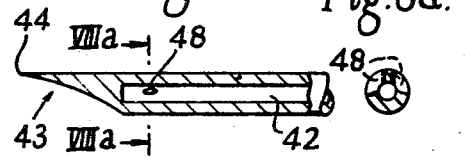
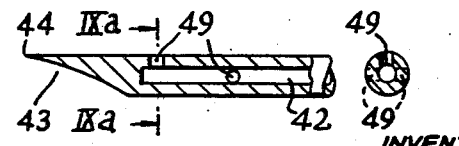

INVENTORS
David H. Hemming
Francis R. Davenport
BY Kenyon, Kenyon
Stewart & Estabrook
ATTORNEYS United States Patent Office 3,485,208
Patented Dec. 23, 1969

3,485,208
APPARATUS FOR INJECTING TOBACCO
SMOKE MODIFYING MATERIAL INTO
MULTIPLE LENGTH FILTER RODS
David Henry Hemming, Bletchley, and Francis Robert
Davenport, Ashtead, England, assignors to Cigarette
Components Limited, London, England, a British
company
Filed Dec. 28, 1964, Ser. No. 421,269
Claims priority, application Great Britain, Dec. 30, 1963,
51,211/63
Int. Cl. B01d 39/00, 39/20
U.S. Cl. 118—401                                  3 Claims

ABSTRACT OF THE DISCLOSURE

There is disclosed apparatus for injecting additional tobacco smoke modifying material into a preformed multiple length filter rod at axially spaced intervals in the rod whereby a multiple length multiple filter rod is formed. The multiple length rods are moved in succession before a set of injection needles with the axis of the rod normal to the axis of the needles. The needles are then moved into and out of the rod.

The present invention relates to tobacco smoke filters. More particularly but not exclusively the invention relates to a method of manufacturing a rod-like body which when cut transverse to its axis forms a plurality of tobacco smoke filters each comprising a section carrying a substance capable of having a filtering or other desired effect upon tobacco smoke and unitary with a section free from said additional substance.

Filters having sections with differing characteristics are known in the art as multiple filters and cigarettes embodying such filters are known as multiple-filter cigarettes.

A rod-like body comprising sections having differing characteristics and which when cut transverse to its axis forms a plurality of multiple filters will be termed in the ensuing description as a multiple length multiple filter.

Multiple filters are made at present by any one of several methods all of which involve at some stage of the manufacture the handling of short rod-like bodies, in some cases as short as 7.5 mm. of differing compositions and co-ordinating and combining them in particular alternate and co-axial and endwise-abutting relationship. The handling of such short bodies on high speed machinery incurs many difficulties which are known to result in undesired stoppages of the production machinery. In some cases wastage of tobacco is also incurred.

It is a purpose of this invention to overcome these difficulties by providing a method of manufacturing multiple filters which does not involve the handling of short rod-like bodies.

The present invention provides a method of manufacturing a rod-like body which when cut through at at least one predetermined point transverse to its axis forms a plurality of tobacco smoke filters each comprising a first section carrying substantially throughout its cross-sectional area an additional substance capable of having a filtering or other desired effect upon tobacco smoke and a second section unitary with said first rod-like section and free from said additional substance, said method including the steps of providing a rod-like body formed of tobacco-smoke-filtering material and injecting into said body at predetermined axially spaced intervals quantities of the said additional substance.

The present invention also resides in apparatus for carrying out the method described in the immediately preceding paragraph, said apparatus comprising at least one injection needle, means for imparting relative movement between the injection needle and the rod-like body in the direction towards and away from one another and means for ejecting predetermined quantities of additional substance from the injection needle when the injection needle is in the rod-like body.

The invention will now be described by way of example with reference to the accompanying drawings in which:

FIGURE 3 is a view on an enlarged scale of one of the injection needles shown in FIGURES 1 and 2 at a stage in the operation prior to that shown in FIGURES 1 and 2.

FIGURES 4 to 9 are views partially in axial section of different types of injection needles for use in the apparatus shown in FIGURES 1 and 2.

FIGURES 4a to 9a are views in a plane normal to the axes of the needles shown in FIGURES 4 to 9 respectively and taken on the lines IVa—IVa to IXa—IXa respectively.

Figure 1:
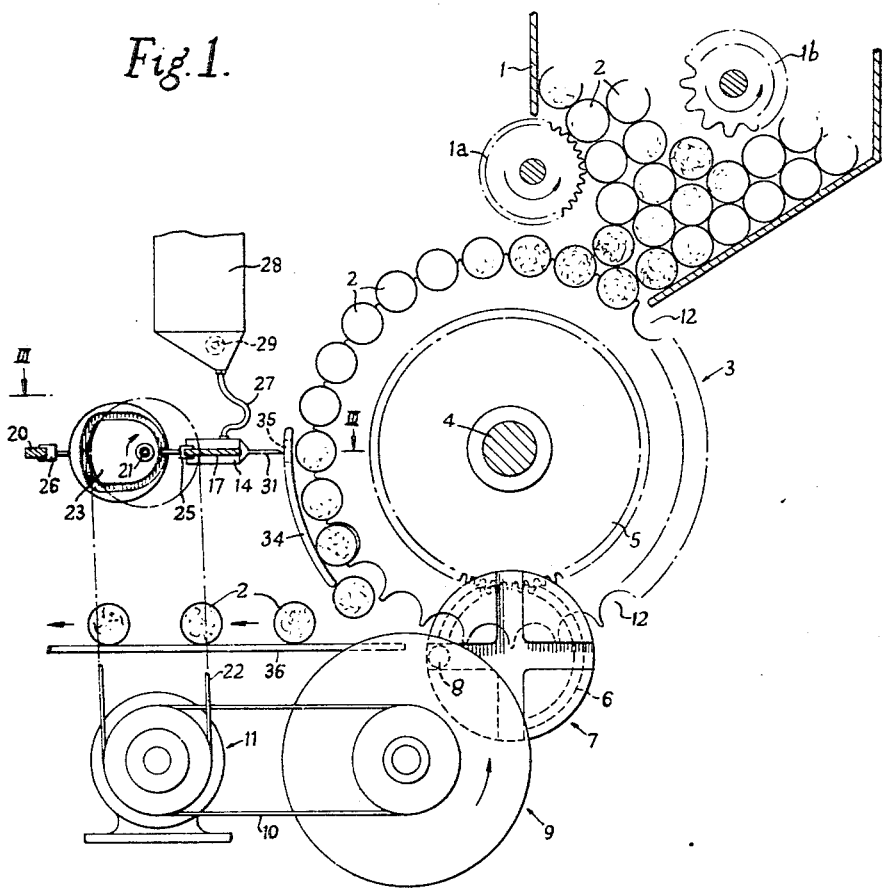
FIGURE 1 is a diagrammatic representation of a side elevational view of an apparatus for carrying out an embodiment of the method of the present invention.

The apparatus shown in FIGURE 1 comprises a hopper 1 for supplying sextuple-length filter rods 2 to a drum 3 mounted for rotation about a shaft 4 having a horizontal axis. The hopper 1 includes a refuser roller 1a rotatable in a counter-clockwise direction as seen in FIGURE 1 and an agitator roller 1b for maintaining a constant downward feed of the filter rods 2 in the hopper 1. One end of the drum 3 is provided with a toothed wheel 5 in meshing engagement with a toothed wheel 6 formed on a Geneva disc 7 mounted for rotation about a horizontal axis. The Geneva disc 7 is driven in known manner by a roller 8 mounted on a wheel 9 itself driven through a chain 10 from a geared electric motor 11.

The peripheral surface of the drum 3 has formed therein a plurality of channels 12 each having its axis parallel to the axis of rotation of the drum 3. The axes of the channels 12 are uniformly angularly disposed about the axis of rotation of the drum 3. The channels 12 are of semi-circular form in section and are of a radius slightly greater than the radius of the filter rods 2.

Located generally in the plane of a horizontal diameter of the drum 3 are four piston-cylinder units 13, 14, 15 and 16 carried on a common frame 17. The frame 17 is mounted with sliding engagement on a pair of guide rails 18.

Each piston-cylinder unit 13, 14, 15, 16 has a piston rod 19 and the free ends of the piston rods 19 are attached to a common cross-head 20 also mounted with sliding engagement on the pair of guide rails 18.

A shaft 21 driven for rotation through a chain 22 by the electric motor 11 has fixedly mounted thereon two side-track cams 23 and 24. The frame 17 carrying the piston-cylinder units 13, 14, 15, 16 is provided with a cam follower 25 with two arms disposed one in each of the two side tracks of the side-track cam 23. The cross-head 20 is provided with a cam follower 26 with two arms disposed one in each of the two side tracks of the side track cam 24.

A flexible conduit 26 extends between each piston-cylinder unit 13, 14, 15, 16 and a reservoir 28. The reservoir 28 is provided with a stirrer 29.

The piston-cylinder units 13, 14, 15, 16 are provided with injection needles 30, 31, 32, 33 respectively, the passages in which are in communication with the spaces in the cylinders. The axes of the needles 30, 31, 32, 33 are directed radially of the drum 3.

A guide 34 is provided for retaining the filter rods 2 in their respective channels 12. The guide 34 has formed therein four apertures 35 for the passage therethrough of the needles 30, 31, 32, 33. The guide 34 extends above the plane of the needles 30, 31, 32, 33 and terminates above and in spaced relationship with a conveyor 36.

Prior to operation of the apparatus the reservoir 28 is supplied with a quantity of the substance capable of having a filtering or other desired effect upon tobacco smoke and which is to be injected into the filter rods 2. The substance may for example, be activated carbon in liquid suspension. The liquid suspending agent may be water. However, other agents may be used which are non-toxic and advantages may be obtained if the agent boils at or somewhat below ambient temperature. Such a low boiling point liquid may be, for example a conventional aerosol propellant comprising halogenated hydrocarbons and mixtures thereof. The mixer 29 is caused to operate in order to maintain a homogenous suspension in the reservoir. The hopper 1 is filled with sextuple length filter rods 2 formed of tobacco-smoke-filtering material which may be, for example, of the known kind comprising a body 37 of cellulose acetate filaments enwrapped in a paper wrapper 38 (see FIG. 3). The body 37 of cellulose acetate filaments extends throughout the length of the rod 2.

The electric motor 11 is caused to rotate and hence the drum 3 rotates in an anti-clockwise direction, as seen in FIGURE 1 with a motion such that the channels 12 are serially stationary opposite the needles 30, 31, 32, 33.

It is arranged that when a channel 12 with a filter rod 2 located therein is stationary opposite the needles 30, 31, 32, 33 the cam 23 moves the frame 17 towards the drum 3 so that the needles enter the filter rod 2 to a position as shown in FIGURE 3. As the frame is moving towards the drum 3 the cam 24 moves the cross-head 20 towards the drum 3. The cam 24 is so formed that whilst the frame 17 is moving towards the drum 3 there is no relative movement between the cross-head 20 and the frame 17 hence there is no movement between the pistons on the ends of the piston rods 19 and their cylinders carried on the frame 17. When the frame 17 stops moving forward, i.e. when the needles are buried in the filter rod 2 as shown in FIGURE 3, the cam 24 continues to draw the cross-head 20 forward so that the pistons move forward in the cylinder barrels of the piston-cylinder units 13, 14, 15, 16. The pistons move forward from their positions shown in broken lines in FIGURE 2 so that communication between the chambers in front of the piston heads and the supply conduits 27 is closed. The pistons continue to move forward and eject quantities of the suspension from the chambers in front of the piston heads, through the injection needles 30, 31, 32, 33 into the body 37 of filamentary material.

The quantity of additional substance ejected from each needle is determined by the stroke of the piston and the cross-sectional area of the cylinder.

Figure 2:
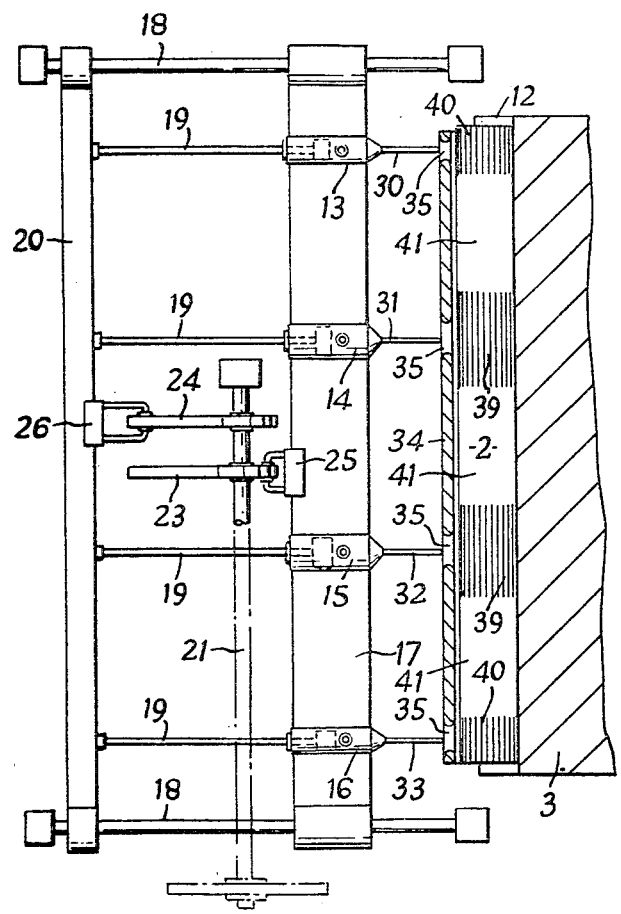
FIGURE 2 is an enlarged view on the line III—III in FIGURE 1.

Prior to the frame 17 being moved rearwardly to withdraw the needles 30, 31, 32, 33 from the filter rod 2 it is arranged that the cross-head 20 is moved rearwardly so that the pistons move rearwardly in their cylinders so that any suspension in the needles 30, 31, 32, 33 is drawn back into the chambers and hence so that upon the needles 30, 31, 32, 33 being withdrawn from the filter rod 2 there is no suspension in the needles which might otherwise flow out and soil the wrapper 38 as the needles pass therethrough. The frame 17 is moved rearwardly under the influence of the cam 23 towards its rearmost position as shown in FIGURE 2. Concurrently, the cross-head 20 moves rearwardly under the influence of the cam 24 at a greater speed than that of the frame 17 so that the pistons move rearwardly relative to their cylinders and in so moving relative to their cylinders communication is re-established between the flexible conduits 27 and the chambers ahead of the pistons. Upon communication between the conduits and the chambers being re-established quantities of the suspension flow from the conduits 27 into the chambers upon further rearward movement of the pistons in their cylinder.

The four shaded section 39 and 40 of the filter rod 2 in FIGURE 2 indicate those regions of the filter rod 2 within which the quantities of suspension ejected from the needles disperse. The sextuple-length filter rods 2 may be, for example 90 mm. long. In this case the end shaded sections 40 are each of 7.5 mm. length and the two shaded sections 39 are each of 15 mm. length. The three unshaded sections 41 are each of 15 mm. length. The seven sections of the rod may be regarded as unitary with one another since the filamentary cellulose acetate body extends throughout the length of the rod. The sextuple length dual filter rod 2 with quantities of the suspension injected thereinto at axially spaced intervals moves with the drum 3 and is held in its channel 12 by the guide 34. At the lower end of the guide 34 the rod 2 drops from its channel 12 onto the conveyor 36 and is carried away and stored, the water or other suspending agent in the suspension being allowed to dry out.

Figure 10:
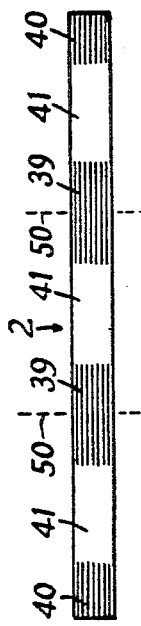
FIGURE 10 shows in diagrammatic form a sextuple-length dual-filter rod formed in accordance with the method of the present invention.
Figure 11:
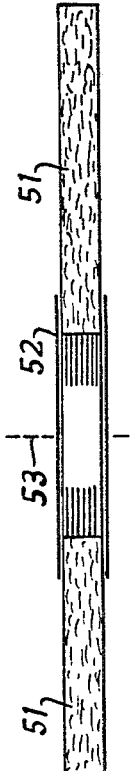
FIGURE 11 shows a double-length dual filter cut from the rod shown in FIGURE 10 and located between and joined to two tobacco rods.

FIGURE 10 shows the sextuple-length filter rod 2 shown in FIGURE 2. In order to assemble the rod 2 into filter cigarettes, the rod is initially cut through along the lines 50 to form three double-length dual-filter rods which are each located between and in axial alignment with two tobacco rods 51, as shown in FIGURE 11. The double-length dual filter is joined to the tobacco rods 51 by a wrapper 52 and a final cut is made through the middle of the axial length of the double length rod, that is, along the line 53, to form two dual-filter cigarettes.

FIGURES 4 to 9 and 4a to 9a show six types of injection needle suitable for use in the above described apparatus. Each of the needles shown comprises a cylindrical body 42 of the order of 1 mm. diameter. Each of the needles has an end portion 43 of wedge form with a sharp tip 44 for piercing the filter rods 2. In the case of the needles shown in FIGS. 4, 4a and 5, 5a the bore 42 is open at the wedge end 43 as well as at the other end, not shown, at which the needles are attached to the piston cylinder units. In the case of the needles shown in FIGURES 6 to 9 the bore 42 is closed at the wedge end 43 of each needle.

The needles shown in FIGURES 5 to 9 each have apertures providing access between the bore 42 and the exterior of the needle at the circumferential, in the present case, cylindrical, surface thereof. The axes of the apertures are directed transversely, in the present case normal, to the axis of the needle.

The needle shown in FIGURE 5 has four apertures 45 uniformly angularly disposed about the axis of the bore 42, as may be seen in FIGURE 5a. The apertures 45 are disposed in two pairs of spaced apart axially of the needle. The axes of the apertures 45 of a pair are aligned on a common diameter of the needle.

FIGURE 6 shows a needle having six apertures 46 disposed in three pairs spaced apart axially of the needle. The axes of the apertures of a pair are aligned on a common diameter of the needle and the common diameter associated with each pair of apertures 46 is disposed in a plane making an angle of 60° with the planes of the other two common diameters.

FIGURE 7 shows a needle having three apertures 47 spaced apart axially of the needle and as may be seen in FIGURE 7a uniformly angularly disposed about the axis of the needle. The walls of the aperture 47 are divergent in the direction away from the bore 42.

FIGURE 8 shows a needle having two apertures 48 spaced apart axially of the needle and with their axes disposed in planes normal to one another. The walls of the apertures 48 are divergent in the direction away from the bore 42.

FIGURE 9 shows a needle having three apertures 49 spaced apart axially of the needle. The axes of two of the apertures 49 are disposed in a common plane and the axis of the third aperture 49 is disposed in a plane normal to the plane of the axes of the other two apertures 49.

The needles shown in FIGURES 8 and 9 are appropriate for use as the needles 30 and 33 because the apertures 48 or 49 in these needles are so located outwardly from the needle over an arc of approximately 180° as opposed to the needles shown in FIGURES 4 to 7, which needles are appropriate for use as the needles 31 and 32 (FIGURE 2), which eject substances over an arc of 360° with respect to the axes of the needles.

It is arranged that the piston-cylinder units 13 and 16 eject a quantity of substance at each stroke equal to half that ejected by the piston-cylinder units 14 and 15.

It will be realised that by providing a plurality of apertures spaced axially of the needles a more uniform dispersion of the additional substance throughout the cross-section of the rod may be achieved. In this case the needle is held stationary whilst the substance is ejected.

As an alternative to the provision of a plurality of axially spaced apertures in the needle to achieve uniform dispersion of the additional substance, the two side back cams 23 and 24 may be so formed that additional substance is ejected from the needle only whilst the needle is being withdrawn from the rod-like body. The needle is inserted into the rod-like body so that the tip of the needle closely approaches but does not extend through the portion of the peripheral surface of the rod-like body diametrically opposite that at which the needle entered the rod-like body. The needle is then moved in a rearward direction and additional substance is ejected from the needle. It is arranged that the rate of flow of additional substance varies as the needle is moved rearwardly. The rate increases as the outlet through which the additional substance is flowing approaches the axis of the rod-like body and decreases as the outlet moves away from the axis. Flow of additional substance is stopped before the outlet passes through the peripheral surface of the rod-like body. The rate of flow of additional substance may be regarded as the weight of additional substance flowing out of the needle in unit time, the needle in this case having a substantially constant velocity, or as the weight of additional substance flowing out of the needle during the time in which the needle moves unit distance, the velocity of the needle in this case being varied.

In the present case wherein the needle has a substantially constant velocity during the time when additional substance is being ejected from it, it is arranged that the speed of movement of the piston of each piston-cylinder unit 13 to 16 relative to the cylinder of the respective unit shall vary. The relative movement being zero when zero outflow of additional substance is required and a maximum when maximum rate of outflow is required. This is achieved by appropriate formation of the tracks on the cams 23, 24. Thus, during portions of the travel of the needles when it is desired that there shall be no outflow, there is no relative movement between the cross-head 20 and the piston cylinder units. When it is desired to eject additional substance on the withdrawal motion of the needles it is arranged that the cross-head moves away from the rod 2 more slowly than the needles 30–33.

In some cases it may be desirable that the section of a multiple filter immediately adjacent the tobacco rod in a cigarette should not contain additional substance. Also it may be desirable to avoid cutting through a section of the multiple length rod which contains additional substance. In either or both of these cases a multiple length, in this case sextuple-length, rod as shown in FIGURE 12 may be formed in accordance with the method of the present invention.

Figure 12:
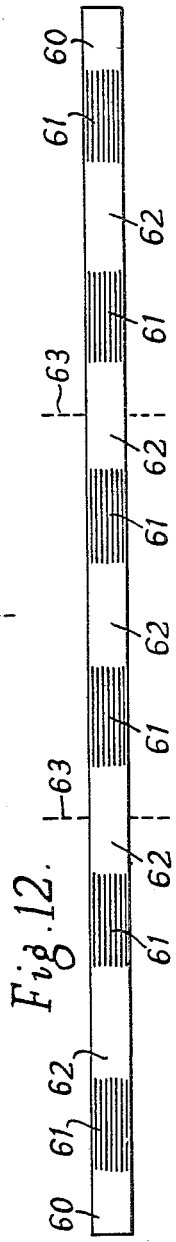
FIGURE 12 shows in diagrammatic form another sextuple-length filter rod formed in accordance with the method of the present invention.

In the case where a multiple filter of 15 mm. length is to be formed, the rod shown in FIGURE 12 is 90 mm. long and has end sections 60 free from additional substance and of 5 mm. length. Located between the two end sections 60 are alternate sections 61 and 62. The sections 61 are of 5 mm. length and contain additional substance and the sections 62 are of 10 mm. and are free from additional substance.

Figure 13:
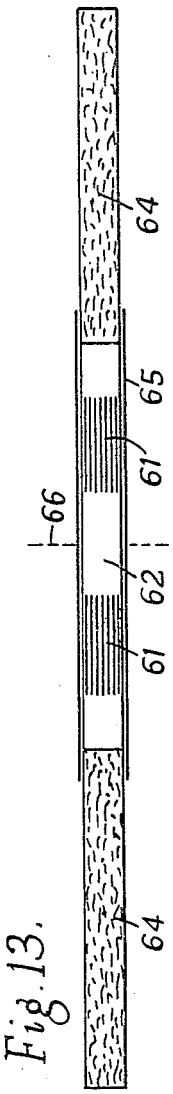
FIGURE 13 is a view similar to FIGURE 11 but showing a double-length filter cut from the rod shown in FIGURE 12.

Cuts are made through the sextuple-length rod at 63 and the three dual-length rods formed are located in axial alignment between and in endwise-abutting relationship with pairs of tobacco rods 64 and are joined to the tobacco rods by a wrapper 65 (see FIGURE 13). A final cut is made along the line 66 to form two multiple-filter cigarettes.

It is to be understood that whilst the method and apparatus described above is appropriate for manufacturing sextuple-length dual-filter rods, the method of the present invention may be employed for manufacturing multiple-length multiple-filter rods of a multiplicity of length other than six and for a multiplicity of differently constituted sections other than two. For example, sextuple-length triple filters may be manufactured in accordance with the method of the present invention. In this case a frame similar to the frame 17 would carry ten piston-cylinder units having injection needles which would be so arranged as to form in a 120 mm. rod a first section of 6.3 mm. length carrying a first substance capable of having a filtering or other desired effect upon tobacco smoke; a second section of 6.3 mm. carrying a second substance capable of having a further filtering or other desired effect upon tobacco smoke; a third section of 14.8 mm. length free from either substance; a fourth section of 6.3 mm. length carrying the second substance; a fifth section of 14.8 mm. length carrying the first substance; a sixth section of 6.3 mm. length carrying the second substance; a seventh section of 14.8 mm. length free from either substance; an eighth section of 6.3 mm. length carrying the second substance; a ninth section of 14.8 mm. length carrying the first substance; a tenth section of 6.3 mm. length carrying the second substance; an eleventh section of 14.8 mm. length free from either substance; a twelfth section of 6.3 mm. length carrying the second substance. and a thirteenth section of 6.3 mm. length carrying the first substance. It is to be understood that in the example quoted above the figures for length are to be regarded as appropriate since the boundaries between adjacent portions of the rod are to some extent irregular.

Carbon has been described above as an example of an additional substance having a filtering or other desired effect upon tobacco smoke. It is to be understood that the method of the present invention is appropriate for injecting substances other than carbon into filter rods; as an example of such other substances may be mentioned menthol.

In some cases it may be desirable that the tobacco-smoke-filtering material to which the additional substance is added should not be present at one or the other of the ends of the filter in a filter cigarette. Also in those cases where two or more additional substances are to be present in the filter of a cigarette it may be desirable, for example, because of their mutual incompatibility or because of different working conditions required for their individual applications or because it is preferable to add the additional substances to different materials, to inject the additional materials into different multiple-length filter rods. In any of these cases the following procedure may be adopted.

Figure 14:
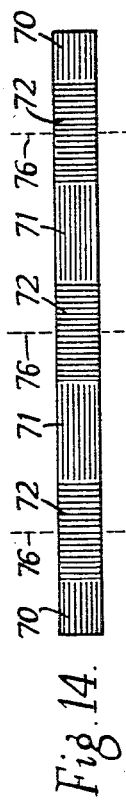
FIGURE 14 shows a filter rod made by the method of the present invention and containing first and second additional substances.
Figure 15:
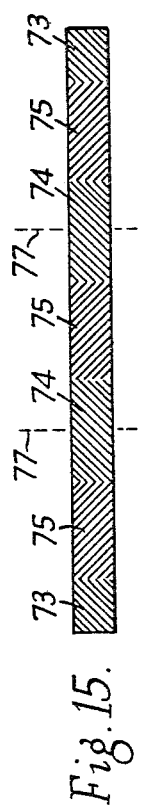
FIGURE 15 shows a further filter rod made by the method of the present invention and containing third and fourth additional substances.

FIGURE 14 shows a first multiple length filter rod made by the method of the present invention and containing two additional substances in alternate sections. The rod has end sections 70 and two further sections 71 containing a first additional substance and three sections 72 containing a second substance. FIGURE 15 shows a second multiple length filter rod also made by the method of the present invention and containing two additional substances in alternate sections. The rod has end sections 73 and two further sections 74 containing a third additional substance and three sections 75 containing a fourth substance. The tobacco-smoke-filtering material extending throughout the length of the rod shown in FIGURE 15 and carrying the additional substances may be the same as or different to that extending throughout the length of the rod shown in FIGURE 14.

Figure 16:
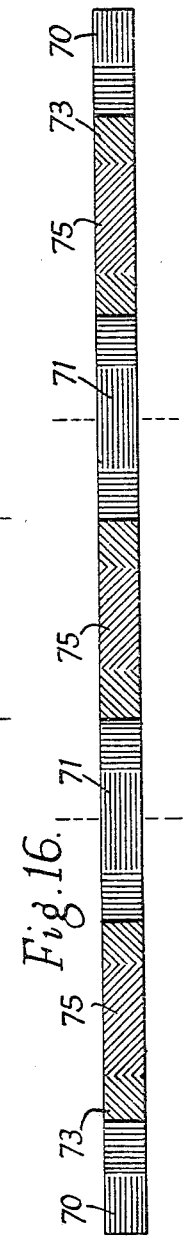
FIGURE 16 shows a sextuple-length quadruple filter rod formed from the rods shown in FIGURES 14 and 15.
Figure 17:
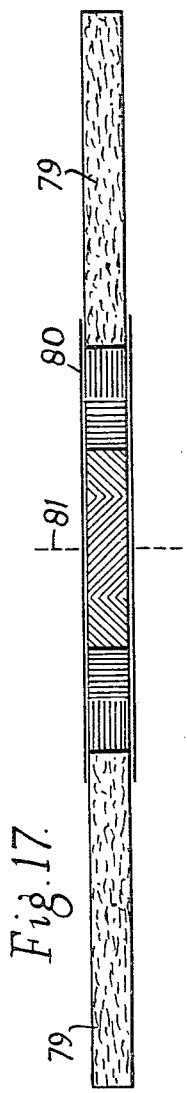
FIGURE 17 shows a double-length quadruple filter formed from the rod shown in FIGURE 16 and located between and joined to two tobacco rods.

The rod shown in FIGURE 14 is initially cut through along the lines 76 and the rod shown in FIGURE 15 is initially cut through along the lines 77. The three rods formed by cutting the rod shown in FIGURE 15 are assembled between the four rods formed by cutting the rod shown in FIGURE 14, as shown in FIGURE 16, and are joined together by a wrapper. The rod shown in FIGURE 16 is cut through along the lines 78 to form three double-length quadruple filters each of which is disposed in endwise-abutting relationship with and in coaxial alignment with two tobacco rods 79, as shown in FIGURE 17 and is joined to the tobacco rods by a common wrapper 80. A final cut is made through the double-length quadruple filter along the line 81 to form two quadruple-filter cigarettes.

It is to be understood that any one, two or three of the above described four additional substances in the rods shown in FIGURES 14 and 15 may be omitted.

What is claimed is:

1. Apparatus for forming multiple length, multiple filter rods comprising a source of supply of multiple length filter rods of tobacco-smoke-filtering material, a source of substance additional to said tobacco-smoke-filtering material and capable of having a desired effect on tobacco smoke, conveying means for moving said rods from said source and advancing them sideways along a path of travel in side-by-side parallel aligned relationship, a plurality of parallel injection needles mounted adjacent said path of travel in a common plane normal to said path of travel and spaced apart laterally across the width of said path of travel, whereby each of said rods in turn is located adjacent said needles by said conveying means with the axis of said located rod in said common plane and intersected by the lines of the axes of said needles, drive means reciprocating said needles together into and out of penetrating engagement with each said located rod in turn through the circumferential surface thereof at respective locations at predetermined intervals along said rod, and means for injecting predetermined quantities of liquid containing additional substance from said source thereof through said needles into said located rod when said needles are in penetrating engagement with said rod.

2. Apparatus according to claim 1 wherein the circumferential walls of the injection needles have apertures for outflow of said additional substance, whose axes are transverse to the axes of the needles.

3. Apparatus according to claim 1 wherein the circumferential walls of the injection needles have apertures for outflow of the said additional substance and the apertures in the circumferential walls of the needles are spaced apart axially of the needles so that the additional substance may be disbursed throughout substantially the entire cross-section of the rod-like body.

References Cited

UNITED STATES PATENTS

| 1,740,484 | 6/1926 | Von Behr | 21—73 |
| 2,333,049 | 10/1943 | Shapiro | 131—133 |
| 2,785,838 | 3/1957 | Mayer | 117—16 |
| 2,881,770 | 4/1959 | Touey | 117—33 |
| 673,268 | 4/1901 | Huntington | 99—256 |
| 1,192,596 | 7/1916 | Albrecht | 99—256 |
| 2,548,948 | 4/1951 | Colburn et al. | 131—88 |
| 2,560,060 | 7/1951 | Zwosta | 99—256 |
| 3,039,367 | 6/1962 | Stelzer | 131—10 |
| 3,052,164 | 9/1962 | Rowlands | 131—10 |
| 2,796,017 | 6/1957 | Schmidt | 99—256 |

FOREIGN PATENTS

| 159,479 | 4/1922 | Great Britain. |
| 348,974 | 5/1931 | Great Britain. |
| 1,270,933 | 7/1961 | France. |
| 296,846 | 5/1932 | Italy. |

WILLIAM D. MARTIN, Primary Examiner

PAUL ATTAGUILE, Assistant Examiner

U.S. Cl. X.R.

117—120, 121, 144, 169; 131—267, 266, 261; 118—506